May 28, 1968   W. C. SMITH ET AL   3,385,673
APPARATUS FOR SUPPRESSING SIDE REACTIONS IN THE
OXIDATION OF HYDROCARBONS
Filed Aug. 16, 1966   2 Sheets-Sheet 2

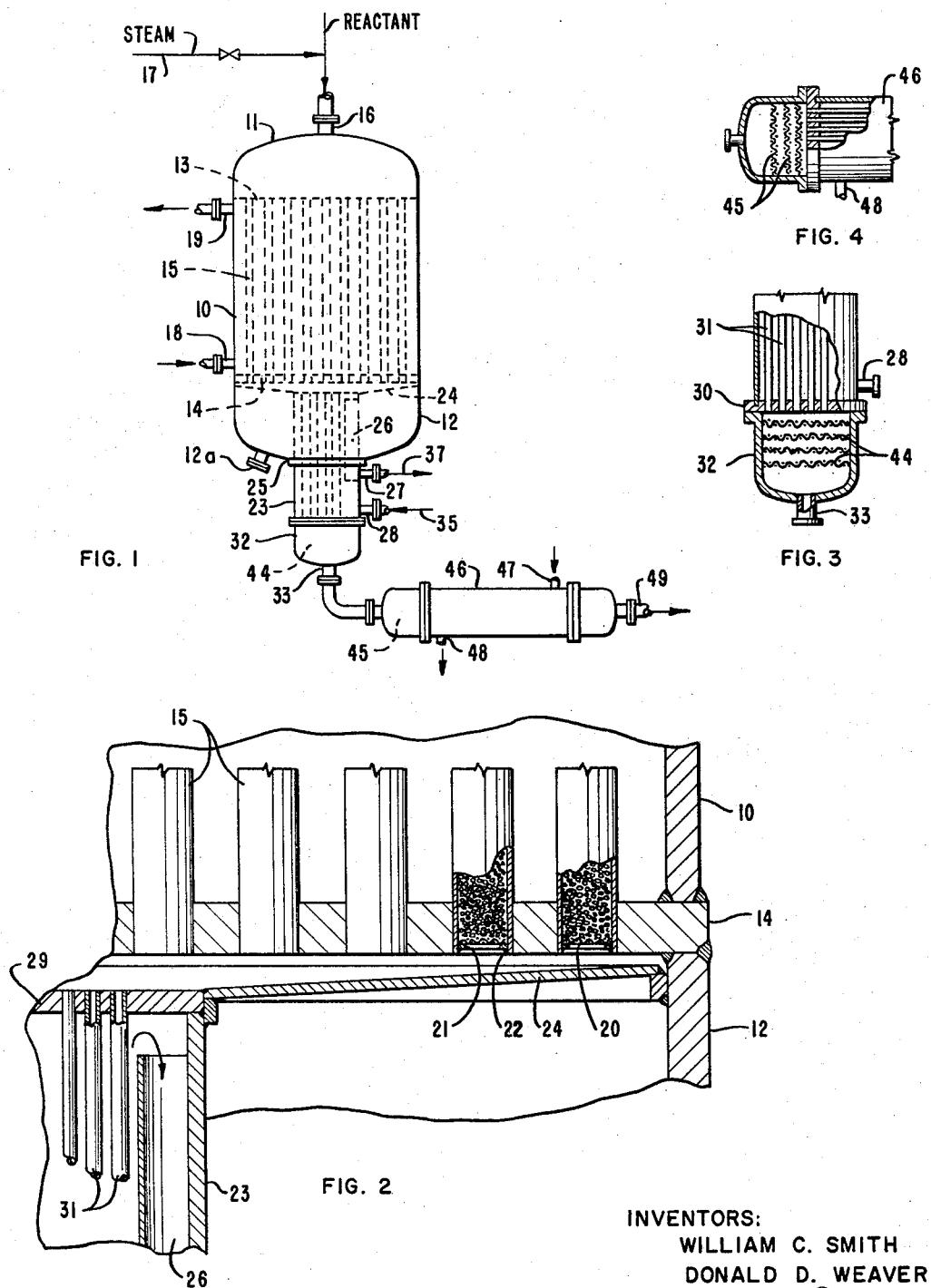

INVENTORS:
WILLIAM C. SMITH
DONALD D. WEAVER
BY:
THEIR AGENT

3,385,673
APPARATUS FOR SUPPRESSING SIDE REACTIONS IN THE OXIDATION OF HYDROCARBONS
William C. Smith and Donald D. Weaver, Houston, Tex., assignors to Shell Oil Company, New York, N.Y., a corporation of Delaware
Continuation-in-part of application Ser. No. 199,721, June 4, 1962. This application Aug. 16, 1966, Ser. No. 572,773
3 Claims. (Cl. 23—288)

ABSTRACT OF THE DISCLOSURE

An apparatus for oxidation of hydrocarbon products wherein side reactions are inhibited comprising flowing the reactants through extended-surface material, a desuperheater and a condenser so as to destroy free radical formation prior to desuperheating and inhibiting post-reactions after desuperheating.

---

This application is a continuation-in-part of copending application Ser. No. 199,721, filed June 4, 1962, now abandoned.

The invention relates to an apparatus designed to suppress side reactions in the product streams produced by partially oxidizing lower hydrocarbons, particularly those having from one through eight carbon atoms, as a vapor at controlled temperatures.

The invention is applicable to equipment designed for carrying out catalytic oxidation of aliphatic, e.g., paraffinic and olefinic as well as alicyclic and aromatic hydrocarbons. Such equipment is particularly applicable for carrying out oxidation reactions of propylene to produce acrolein or acrylic acid. In reactions of the present invention a mixture of the hydrocarbons and oxygen in amounts either smaller than that for complete oxidation, or sufficient for complete oxidation, if desired together with a diluent, such as steam and/or nitrogen, is passed through a plurality of tubes containing a suitable catalytic material on an inert bed under temperature-controlled conditions in the reaction zone. Specifically, the reaction zone comprises a plurality of catalyst-filled tubes mounted within a reactor vessel arranged for the circulation of a coolant on the outer sides of the tubes, to maintain a controlled reaction temperature, e.g., from 500° to 800° F. The product stream discharged from such a reaction zone is in the vapor state and at reaction temperature; it contains residual oxygen and highly reactive free radical materials, which give rise to side reactions prior to and during condensation of the product. Such side reactions are also called post-reactions.

The consequences of such side reactions are reduced yield of the desired end product and fouling of the system equipment such as reactor tubes and cooling and condensing apparatus by deposition of heavy reaction products, especially polymers.

It has long been recognized that to suppress such side reactions it is necessary to cool the product stream promptly upon emerging from the reaction zone, e.g., by applying a quenching liquid to the emerging stream and/or by reducing to a minimum the time that such stream remains at the reaction temperature before being cooled. However, in reactions involving partial oxidation wherein the reaction temperature is controlled by cooling, the presence of residual oxygen and/or free radicals has made these techniques only partially effective. Quenching, in particular, has been difficult to apply and is not always feasible, due to physical deterioration of the equipment and the impossibility of achieving uniform cooling of all parts of the product stream.

It is the general object of the invention to provide an improved method and apparatus for suppressing side reactions in the product stream discharged from the partial oxidation of hydrocarbons in a temperature-controlled reaction zone.

A particular object is to destroy free radicals which are present in such a product stream or are formed therein, thereby to reduce or prevent the formation of heavy by-products, especially polymers, e.g., such as tend to foul condensing equipment.

A specific object is to reduce or prevent the thermal post-reaction of residual oxygen in the product stream with other constituents of said stream by destroying free radicals therein prior to cooling thereof to below reaction temperature.

Another specific object is to inhibit the formation of heavy by-products, especially polymers, in the cooled product stream upon or during condensation by destroying free radicals in the cooled vapor product stream regardless of whether thermal post-reaction was controlled as indicated in the preceding paragraph.

In summary, according to the invention, it was found that formation of heavy by-products in the production of oxygenated hydrocarbons such as producing acrolein and acrylic acid by oxidation of propylene, side reactions can be reduced or essentially prevented by flowing the product stream formed by catalytic oxidation of lower hydrocarbons such as propylene from the reaction zone, in the vapor state, through a desuperheater containing at its outlet end a non-catalytic mat or solid mass of fine ferrous metal strands, sometimes called chips or rings or wire, which may be regularly oriented, e.g., knitted or woven, or randomly oriented, having a high surface-to-volume ratio such as wire mesh, steel wool, carbon or stainless steel packing or rings having a surface-to-volume ratio in excess of 8 ft.$^2$/ft.$^3$ and preferably in excess of 50 ft.$^2$/ft.$^3$, so as to allow the product stream to flow therethrough and into a condenser, the inlet head of which is also packed with said non-catalytic mat and the product stream in contact with said mat in the condenser is still in a vaporous state.

The product stream prior to entering the desuperheater passes through a void area for a fraction of a second to 5 seconds and thereafter the product stream passes through the desuperheater containing in its outer end a body or bodies of high surface-to-volume ratio non-catalytic ferrous material referred to as extended-surface material at controlled temperature and residence time so as to destroy free radical formation and reduce or prevent polymer formations prior to condensing the product stream. The product stream flows through a catalytic bed in the reaction tubes of the reactor and comes in contact with the non-catalytic extended-surface material in the desuperheater outlet head only a fraction of a second after leaving the reaction zone to inhibit the thermal post-reaction of residual oxygen and this is depended on the temperature, the residence time and the surface-to-volume ratio of the non-catalytic metallic extended-surface material. Post-reactions of residual oxygen and polymer formation in the product stream on leaving the reaction zone can be inhibited or prevented by flowing or contacting said product stream after desuperheating but prior to condensation is achieved to within 75° F. of the condensation temperature through a bed of non-catalytic inert mat or fine ferrous metallic extended material having a high surface-to-volume ratio and under controlled temperature and residence time conditions.

To inhibit thermal post-reaction of residual oxygen and prevent polymerization in the product stream immediately after discharge from the reaction zone, e.g., at a temperature between about 575° to 760° F., the product stream should be contacted in the outer head of the desuperheater with a solid inert material which should preferably provide surface-to-volume ratio in excess of 8–40 square feet per cubic foot of bulk volume and preferably 50 square feet per cubic foot of bulk volume, and higher ratios up to 325 ft.$^{-1}$ may be used. In general, higher ratios are desirable for higher product-stream temperatures and for longer residence times. For many applications materials having ratios between 17 and 40 ft.$^{-1}$ are preferred for inhibiting polymerization; however, higher ratios are desirable when lower residence times are used. Further, to present as low a resistance to flow as feasible, they should in both applications have a high free volume, preferably above 70% and, typically, from 92 to 98%. (By free volume is meant the percentage of the bulk volume of the solid mass which is occupied by passages.) Such materials usually are formed from metal strands having diameters less than 0.05 inch, often about 0.001 inch, although the strands are not necessarily circular in cross section.

The solid non-catalytic metallic material is herein, for convenience, called an extended-surface material. It may be placed to be traversed by the product stream after emerging from the reaction zone and prior to emerging from the outlet head of the desuperheater and passing into the condenser inlet head provided that in each instance the product stream flows through said material in the vapor state.

When the extended-surface material is traversed by the product stream in the outlet head of the desuperheater and the condensation inlet head, it may fill substantially all of their flow passages of the desuperheater outlet head or the extended-surface material may be placed only within a fractional part of such passages sufficient to cause the product stream to have a residence time of less than 0.1 second in regions of lower surface-to-volume ratios. This is founded on the obseravtion that thermal post-reactions which are propagated by a free-radical mechanism appear to become uncontrollable only when the free radicals reach a certain concentration. Since the rate of formation of the free radicals is apparently not instantaneous, an induction period exists before thermal reactions become serious; this period appears, in the reactions noted above, to be of the order of about 0.01 to 0.1 second. It is inconvenient to design plant reactors to provide such short residence times in the flow passages after emergence from the reaction zone and prior to desuperheating to below reaction temperature, and the extended-surface material, by destroying such free radicals, makes it practical to use residence times over 0.1 second, often as high as 0.5 to 2 seconds, depending principally upon the temperature.

To inhibit polymerization by flow of the desuperheated stream through such material, the residence time should, preferably, be at least 0.5 second, e.g., 1 to 10 seconds, shorter residence times being used for higher turbulence and higher surface-to-volume ratios.

The invention is founded on the discovery that flowing the product stream in vaporous state through such extended-surface material in the outlet head of the desuperheater and condenser inlet head produces two separate effects, both of which reduce side reactions:

(1) It was found that the non-catalytic, free-radical propagated post-reaction of residual oxygen with other constitutents of the product stream was significantly reduced by flow through such an extended-surface material soon after emerging from the reaction zone, i.e., before the end of the induction period. Experimental work has shown that the rate of fouling in product condensers increases as the extent of such post-reaction increases. This work further showed that a fifty-fold reduction in the fouling rate was achieved when the thermal post-reaction was reduced to zero from that normally occurring in the passages between a reactor and the cooler in the case of the product stream resulting from the catalytic oxidation of propylene with oxygen wherein 90% of the oxygen had been reacted in the reactor.

(2) Even when post-reactions are not controlled or are only partially controlled, flow of the product stream through an extended-surface material was found to have a significant effect on the rate of fouling. Thus, in a product stream wherein such oxidative post-reactions have occurred, there are still free radicals which initiate polymer formation. Experiments have shown that this ploymer formation is principally a liquid-phase reaction and can be effectively reduced by destroying the free radicals by such an extended-surface material while the stream is still in the vapor phase, either during or after desuperheating.

The invention will be further described with reference to the accompanying drawings showing a preferred embodiment of the invention, wherein:

FIGURE 1 is an elevation of a catalytic reactor to which the extended-surface material is applied;

FIGURE 2 is an enlarged vertical sectional view of a portion of FIGURE 1, showing the catalyst filled reactor tubes, the inlet head of the desuperheater and the void in the false head between the reactor tubes and the inlet head of the condenser;

FIGURE 3 is a vertical sectional view of another portion of FIGURE 1, showing the extended-surface material at the outlet of the desuperheater;

FIGURE 4 is a sectional view of the inlet head of the condenser containing extended-surface material as shown in the outlet head of the desuperheater by 44;

Figure 5:
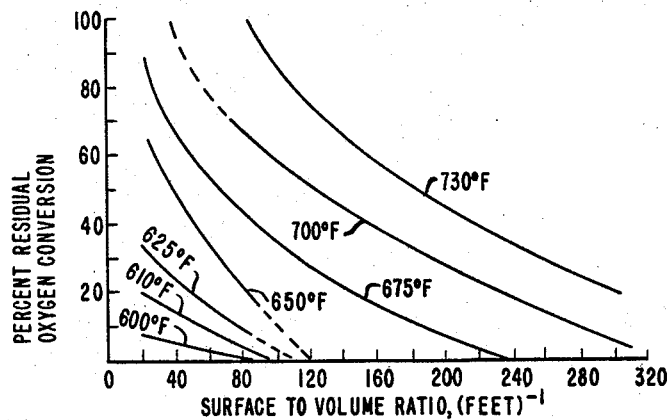
FIGURES 5 and 6 are graphs showing, respectively, the effects of different surface-to-volume ratios in extended-surface materials and of residence time on the conversion of residual oxygen; and, FIGURE 7 is a graph showing the effect of extended-surface material on the formation of polymers, when applied to a stream in which thermal post-reaction is not controlled.

Referring to FIGURE 1 of the drawing, there is shown a pressure vessel 10 having top and bottom dome-shaped closures 11, 12 and containing upper and lower reactor tube sheets 13, 14 and a plurality of reactor tubes 15, each containing suitable catalyst, e.g., granular catalyst or catalyst deposited on their inner surfaces. The bottom closure 12 has a normally closed manway 12a. The top closure 11 has an inlet 16 through which a reactant stream, e.g., one containing essentially a hydrocarbon in the gaseous state and oxygen, is admitted. Steam may optionally be admitted from a pipe 17. The reactant stream enters the space above the upper tube sheet and flows down through the several tubes, resulting in an exothermic reaction in which the hydrocarbon is partially oxidized. These reaction tubes are cooled externally by a coolant, such as a liquid which is vaporized at the reaction temperature, or a non-vaporizing liquid, e.g., admitted into the inter-tube sheet space through an inlet 18 and discharged through the outlet 19. The catalyst is retained within the reaction tubes by individual screens 20 and the tubes are supported by a plate 21 having openings in alignment with the tubes and supported by welds 22 from the tube sheet.

A heat exchanger 23 is mounted in the lower closure 12 to desuperheat the product stream emerging from the reactor tubes. In the case of large reactors, especially when constructed to withstand high pressures, it is not feasible to mount the lower tube sheet 14 near the closure 12 and in such cases it is desirable to extend the heat exchanger into the vessel 10 as shown to bring the top of the exchanger near to said lower tube sheet; and to provide an annular partition 24 within the vessel a short distance below the lower tube sheet, extending radially outwards from the heat exchanger to the vessel wall, thereby reducing the space through which the product stream must flow before entering the heat exchanger.

When the heat exchanger is mounted as outlined in the preceding paragraph, it is supported in sealed relation from the closure 12 by a bolting flange 25 and contains a wall 26 defining a vertical channel which extends from near the top of the exchanger wall to a nozzle 27 situated below the closure 12. A second nozzle 28 is situated near the bottom of the exchanger shell. The exchanger contains upper and lower tube sheets 29 and 30 (FIGURES 2 and 3) fitted with exchanger tubes 31. Bolted to the bottom of the exchanger shell is an outlet casing 32 having a product outlet nozzle 33 and contains extended-surface material 44.

Coolant, e.g., water, may be admitted to the nozzle 28 by suitable means not shown. Steam, often containing water, is discharged from the top of the exchanger downwards through the channel defined by the wall 26 and out through the nozzle 27. Make-up water is admitted if necessary by suitable means not shown into nozzle 27. The exchanger is operated to desuperheat the product stream to a temperature within 75° F. above condensation temperature.

The material 44 may, for example, be stainless steel wire mesh having a surface of 65 to 325 square feet per cubic foot and a free volume of 95% and may fill substantially all of the space above the partition.

Further, in addition to or in lieu of the material 44, similar extended-surface material 45 may be placed within the inlet head of condenser 46 when the temperature of the coolant in the exchanger is controlled to cool the product stream only to a temperature above its dew point such as above 320° F. at 85 p.s.i.g.

As appears further in FIGURE 1, the nozzle 33 is connected to a condenser 46 wherein the desuperheated product stream is further cooled by a liquid coolant admitted at 47 and discharged at 48 at a temperature to condense the condensable reaction products. The condensate, together with uncondensed gases, is discharged at 49 for separation and recovery by suitable means, not shown.

As was previously noted, the necessary surface-to-volume ratio in the material used to check post-reaction of residual oxygen in the hot product stream leaving the reactor tubes depends principally upon the temperature of the product stream, but is also a function of the amount of residual oxygen and the residence time of the stream within the flow passages between the catalytic reaction zone and the cooler. When these latter two variables increase higher surface ratios are desirable.

Catalytic agents suitable in the reaction zone include copper-containing catalysts, e.g., cuprous oxide alone or supported on a carrier or supporting material or bismuth-containing catalyst such as bismuth silicomolybdate or bismuth silica-phosphomolybdate as well as tellurium compounds such as tellurium-bismuth molybdenum catalyst.

EXAMPLE I

An indication of the effect of variations in the surface-to-volume ratios is shown in FIGURE 5, which gives, for various temperatures of the stream, as ordinates, the percent of residual oxygen conversion and as abscissae the ratios. These data were obtained for a product stream resulting from the reaction of oxygen and propylene in reaction tubes containing a copper catalyst which was specifically 3.8±0.2% Cu mirror-plated $\frac{3}{16}$ inch diameter alumina (Alundum) pellets. The feed stream consisted of 30.6% propylene, 5.1% oxygen, 14.8% nitrogen, 49.2% steam and .3% of other $C_3$ hydrocarbons, all quantities being mol percent. The reactor pressure was 90 pounds per square inch gage and the reaction temperature between 600° and 730° F.; 90% of the oxygen was reacted. The hot product stream had an average residence time of 0.88 second at a pressure of 83 pounds per square inch gage in the passages containing stainless steel packing as the extended-surface material, and the said material filled essentially the total flow space between the reaction tubes and the desuperheater. Parts of the curves which are dashed are extrapolated. The principal oxidation products in the stream were acrolein (1.72 mol percent) and $CO_2$ (1.57 mol percent).

It is evident that flow through extended-surface material greatly reduced the conversion of the residual oxygen in the stream, and that higher surface-to-volume ratios are desirable for higher temperatures. Other data has shown a relation between the extent of residual oxygen conversion during the post-reaction and the rate of polymer deposition on the product condensers. For example, with a stream such as that described above, the amount of polymer deposition was reduced to 56%, 42% and 2.5% of that encountered with uncontrolled post-reactions when the post-reactions were reduced from 100% respectively to 50%, 25% and 0%.

Figure 6:
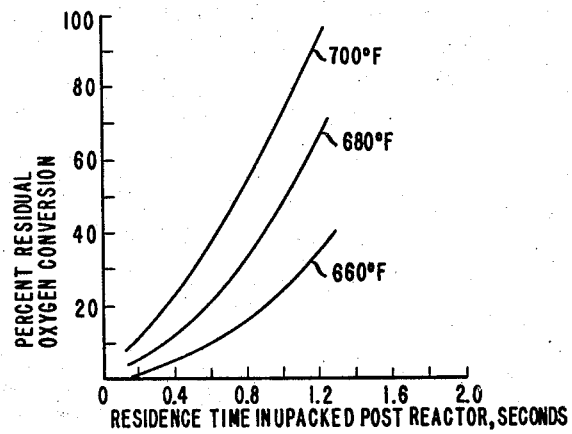

As was previously noted, residence time is another parameter affecting the conversion of oxygen in the post-reaction. FIGURE 6 shows the effect of residence time in an unpacked post-reactor space on the residual oxygen consumption for the stream described in Example I. It is evident that residence time as long as 0.88 second, used in that example, would lead to exceessive post-reaction if the extended-surface material were not used.

EXAMPLE II

Figure 7:
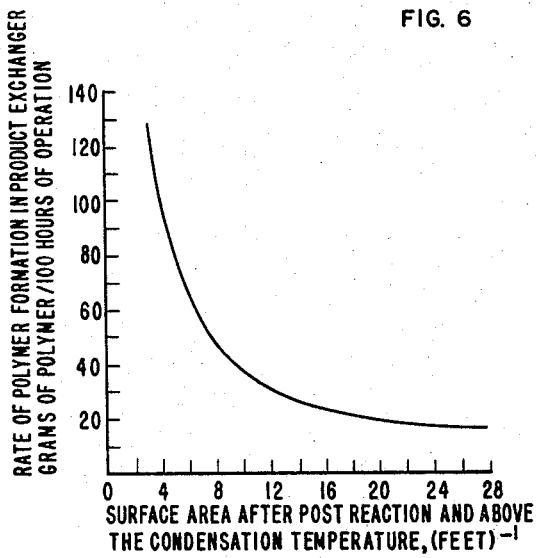

FIGURE 7 shows the effect of flowing the product stream, after desuperheating but before condensation, through an extended-surface material such as stainless steel packing of rings after complete conversion of residual oxygen by post-reaction before desuperheating, the initial product stream being as described in Example I. In this instance the rate of polymer formation in the product-condensing heat exchanger is plotted as ordinates and the surface-to-volume ratio of the extended-surface material is plotted as ordinates. The data are for flow of the product stream at a temperature of 320° F. through a mass of material which gave a residence time of 6.7 seconds.

We claim as our invention:

1. A reactor for effecting partial oxidation of lower hydrocarbons which comprises:

(a) an elongated tubular wall defining a confined reaction zone having inlet and outlet openings and a plurality of catalytically filled reaction tubes being supported by upper and lower tube sheets;

(b) means for controlling the temperature in said reaction zone;

(c) a desuperheater connected to receive vaporous product stream from the outlet openings of the cataylti-cally filled reaction tubes of the reaction zone and containing in the outlet head of the desuperheater a non-catalytic body of solid extended-surface material having a surface-to-volume ratio in excess of 8 square feet per cubic foot and a free volume in excess of 70%; and, (d) a condenser connected to the desuperheater to receive the vaporous contacted product stream, the inlet head containing non-catalytic solid extended-surface material.

2. A reactor as defined in claim 1 wherein the extended-surface material in the outlet head of the desuperheater and the inlet head of the condenser have a surface-to-volume ratio in excess of 17 square feet per cubic foot.

3. A reactor as defined in claim 1 wherein the extended-surface material in the outlet head of the desuperheater has a surface-to-volume ratio in excess of 50 square feet per cubic foot and the extended-surface material in the inlet head of the condenser has a surface-to-volume ratio in excess of 8 square feet per cubic foot.

References Cited

UNITED STATES PATENTS

| 2,398,612 | 4/1946 | Bergsteinsson et al. | 260—604 |
| 2,810,739 | 10/1957 | Lake et al. | 260—451 |
| 3,146,075 | 8/1964 | Robb et. al. | 23—288 |
| 3,147,084 | 9/1964 | Franzen et al. | 23—288 |

JOSEPH SCOVRONEK, *Primary Examiner.*